United States Patent [19]

Esposito

[11] 4,315,635
[45] Feb. 16, 1982

[54] OBSTRUCTION TRAVERSING HAND TRUCK

[76] Inventor: Patsy Esposito, 350 Clarkson Ave., Brooklyn, N.Y. 11226

[21] Appl. No.: 128,290

[22] Filed: Mar. 7, 1980

[51] Int. Cl.³ .............................................. B62B 1/04
[52] U.S. Cl. .................................. 280/655; 280/47.29
[58] Field of Search ............... 280/47.27, 47.28, 47.29, 280/655, 654, 47.37 R, 650, 639

[56] References Cited

U.S. PATENT DOCUMENTS

| | | | |
|---|---|---|---|
| 3,046,035 | 7/1962 | Nichols | 280/47.27 |
| 3,168,330 | 2/1965 | Smith et al. | 280/47.37 R |
| 3,456,960 | 7/1969 | Rector | 280/47.29 |
| 3,788,659 | 1/1974 | Allen | 280/654 |

FOREIGN PATENT DOCUMENTS

| | | | |
|---|---|---|---|
| 1319847 | 6/1973 | United Kingdom | 280/47.27 |
| 1357157 | 6/1974 | United Kingdom | 280/655 |

Primary Examiner—David M. Mitchell
Attorney, Agent, or Firm—Auslander, Thomas & Morrison

[57] ABSTRACT

A collapsible hand truck with an extendable platform is constructed to slide over obstacles. The axle supports slope to the upper rear of the frame and form a guide surface to guide the hand truck to the wheels as it traverses an obstruction.

5 Claims, 4 Drawing Figures

OBSTRUCTION TRAVERSING HAND TRUCK

The present invention relates to an obstruction traversing hand truck, an improved hand truck, particularly an improvement over the hand truck disclosed in my patent application, Ser. No. 82,944 filed Oct. 9, 1979 entitled Hand Truck.

Small, heavy-duty collapsible hand trucks have to be adapted to carry many different types of loads, such as luggage, trash cans, musical instruments or equipment, or camping supplies, over varying terrains, such as streets, curbs, steps, fields or rocks. Loads may be bulky and heavy, of awkward shapes, and usually are secured to the hand truck by bungee with hooks. Because such hand trucks are small, particularly with heavy or bulky loads, care must be taken not to overbalance the hand truck and spill or loosen the load, or to unduly shake the hand truck while taking a load over obstructions, so that the load is not dangerously jostled.

The prior art hand trucks with wheels, for example, of six inches in diameter, set back as disclosed in my said copending application, provided steady support for the hand truck load, with its platform extended. When the hand truck was tugged with a load, it moved on the wheels, which pivoted the hand truck with its load, substantially balanced as the hand truck was tugged by its handle.

A shortcoming of the hand truck of the prior art was that while the wheels could roll over many obstructions or even up steps, it was often difficult to maneuver steps, curbs or other obstructions without having to physically lift the hand truck with a load, over the obstruction, or the hand truck had to be tilted forward so that the wheels could engage the obstruction's surface to allow the hand truck to be maneuvered over it. The maneuvering or tilting often-times unbalanced the load on the hand truck, as well as generally slowing the progress of transporting a load on the hand truck.

In the maneuvering of a hand truck of the past up steps, which oftentimes have protruding lips, further jostling often occurred as the wheels of the hand truck negotiated the back of the step, then had to swing outward to roll over the step lip.

The axle support on my said copending hand truck, extended behind the load-receiving face of the frame to support the axle and support the extendable platform. In this configuration, the hand truck will remain erect, with the platform extended and may easily be rotated backward with a load, which is being tugged on the hand truck. With a retractable handle attached behind the load-receiving face of the frame, the configuration of my copending application may receive heavy loads and be collapsed to a relatively small size. The axle supports enable balancing of the hand truck, provides strength and are structurally essential to the functioning of the hand truck.

According to the present invention, an obstruction traversing hand truck similar to my said copending application hand truck is provided with axle supports extending rearward from the frame and sloping upward and joining the frame near its upper portion, projecting protectively beyond the collapsible handle. The axle support extension, or guide portion, serves as a bearing surface or camming surface, to ease the hand truck of the present invention smoothly over obstructions, and to smoothly guide the hand truck over an obstruction until the wheels are are fully engaged with the surface they are traversing, and fully supporting the hand truck.

The extended axle support, guide portions, provide the structural strength of the prior art, yet allow the hand truck of the present invention to be smoothly lifted over obstacles, tugged at any convenient angle either with the wheels engaging the surface over which it is being tugged, or without wheels engaging such surface. The sloping angulation of the guide portion, guides the hand truck to a smooth transition from lifting the hand truck of the present invention over an obstruction, with the guide portion serving as a guide to engage with the obstruction until the wheels of the hand truck engage the obstruction and then continue to run free until another obstruction must be overcome.

Thus, whether the hand truck of the present invention is slid on the guide surface, or uses a combination of wheels and guide portion, the movement of the loaded hand truck may be at a convenient natural angle with a minimum of jostling of the load.

In a preferred embodiment, a collapsible hand truck includes a frame, axle supports extending behind the load-receiving face of the frame, with an axle mounted on said axle supports and wheels mounted on the axle. There is an extendable platform also mounted on the axle. The axle supports have an extended guide portion which slopes from the rearward position of the axle supports to the upper portion of the frame. The guide portion may comprise a single bent piece of tubing whose outer portion acts as a guide surface. In a preferred embodiment, the axle supports are welded to the upper and lower portions of the frame. It is preferable that at least one cross brace be provided as a combined handle stop and guide, and that it be placed between the guide portions of the axle supports in a manner where it will not be affected by the sliding of the hand truck along the guide surfaces.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
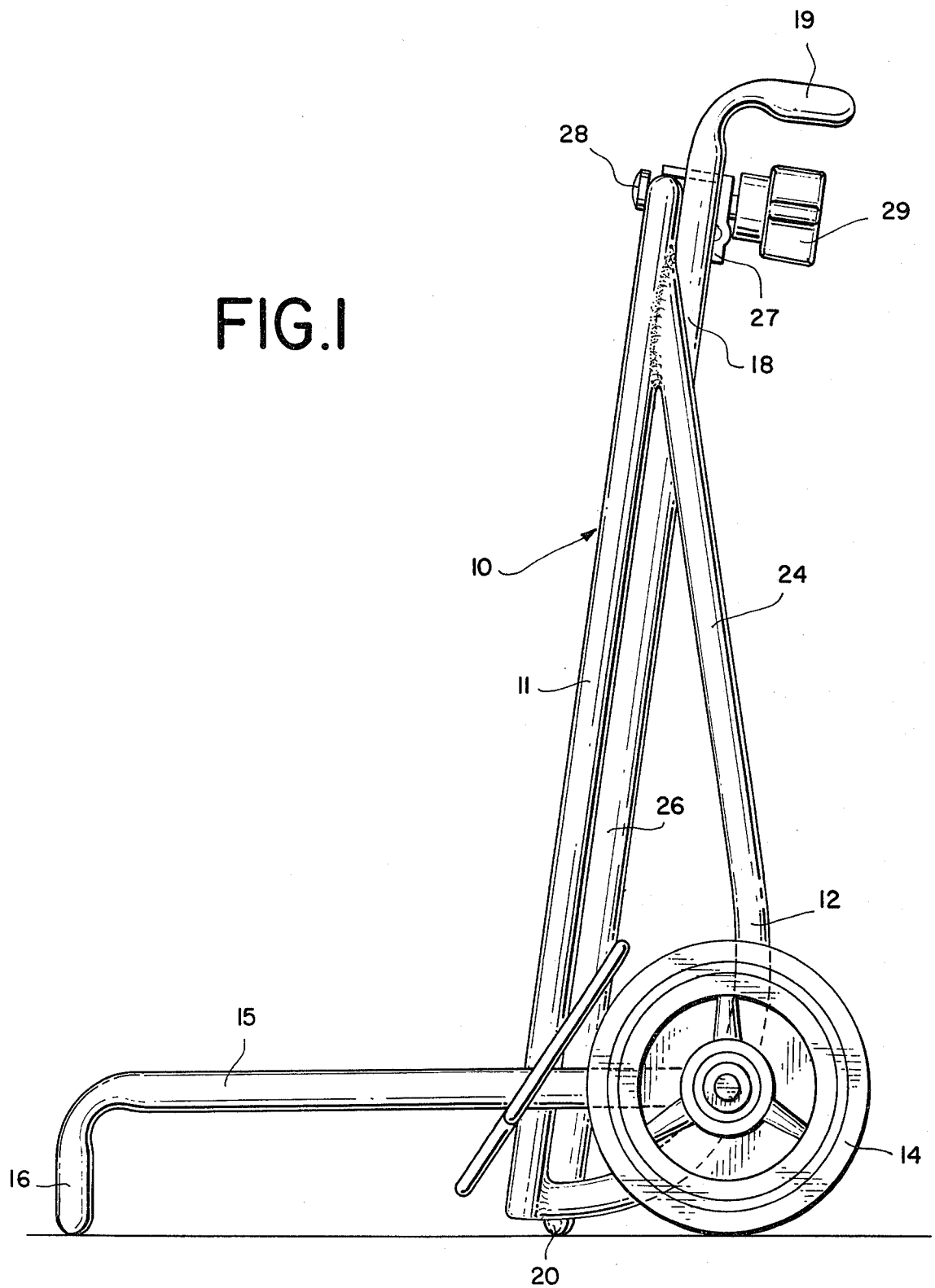
FIG. 1 is a side elevation of the hand truck of the present invention with its platform extended.
Figure 2:
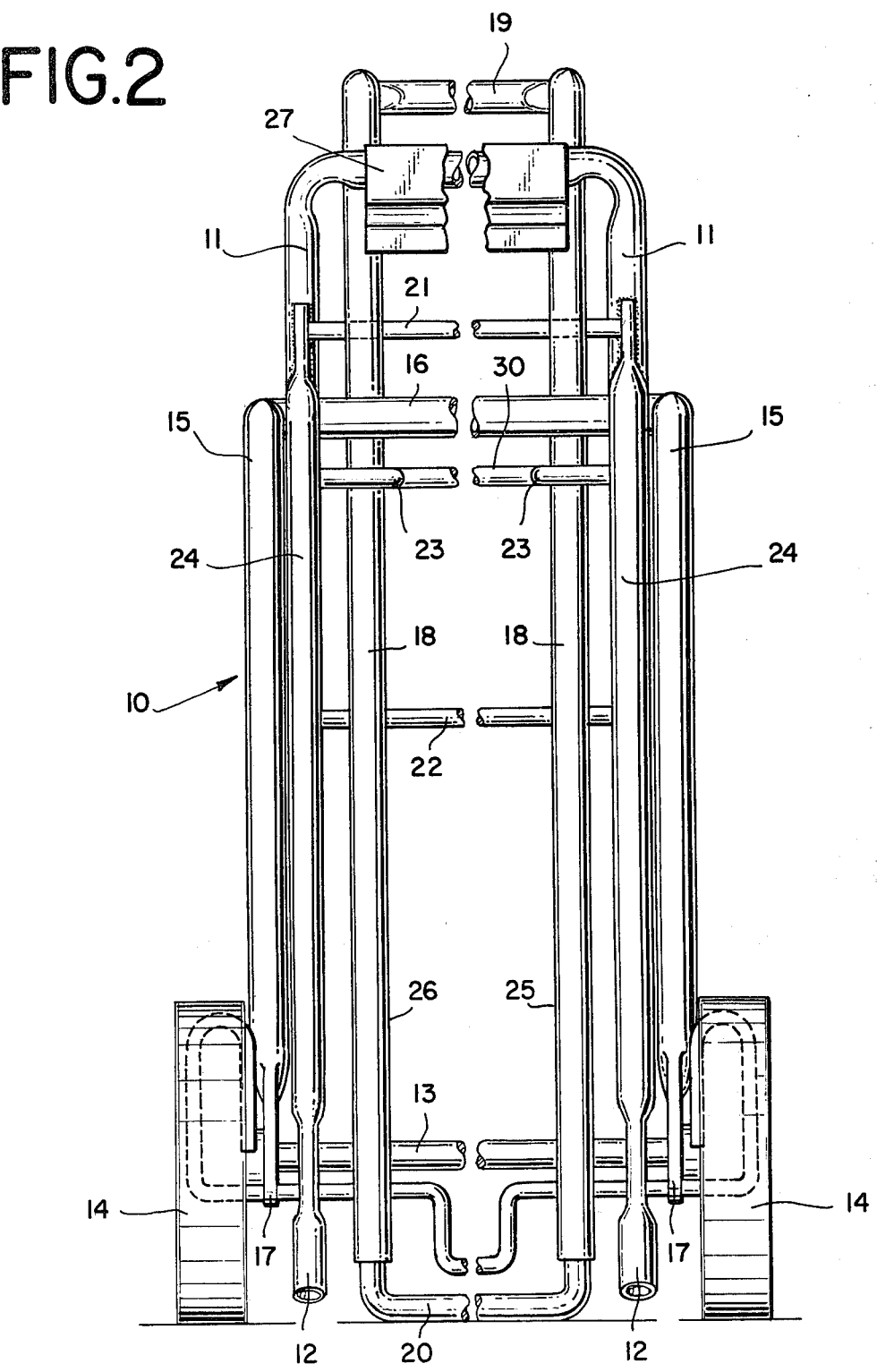
FIG. 2 is a cut-away rear elevation of the hand truck of FIG. 1.

The hand truck 10 comprises a basic U-shaped bent tubular frame 11. Axle supports 12 extend behind the flat face of the U-shaped frame 11 and support an axle 13 onto which are mounted wheels 14. An extendable platform 15 is another bent tubular frame having a bent lip 16. The free ends 17 of the platform 15 tubing are flattened with openings (not shown) through which the axle 13 is threaded. The platform 15 is positioned between the wheels 14 and the axle support 12.

An extendable handle 18 is a bent tubular frame with a bent lip 19, preferably with a bottom closure 20. The handle 18 rests between the frame crossbraces 21, 22, which are substantially on a plane with the frame 11 and a brace 23 attached to the extending guides 24 of the axle support 12. The brace 23 engages the arms 25, 26 of the handle 18. The handle 18 is controlled by a bracket 27, held on the screw 28 which passes through the frame 11 and is tightened by a threaded handle 29.

The handle 18 is extended by loosening the threaded handle 29, grasping the lip 19 of the handle 18 and raising it. The closure 20, which is firmly engaged in the arms 25, 26 of the handle 18, acts as a stop and engages the inset portion 30 of the brace 23. The brace 23 and crossbraces 21, 22 keep the handle 18 guided in a track formed by the crossbraces 21, 22, 23 and the inset 30. The handle 18 is held in extended position by tightening the threaded handle 29. The ends of the bracket 27 tightly grasp the arms 25, 26 from the handle 18 and hold the handle with the closure 20 stopped on the inset 30 and squeezed between the bracket 27 and the frame 11.

The handle 18 may be retained in retracted position by the threaded handle 29, holding the handle 18 in its unextended position tightened against the brace 27.

It is preferable that the guide 24 of the axle support 12 be welded to the upper and lower portions of the frame 11 for strength and stability. The brace 23 is also preferably welded to the guide 24 at its upper portion.

Figure 4:
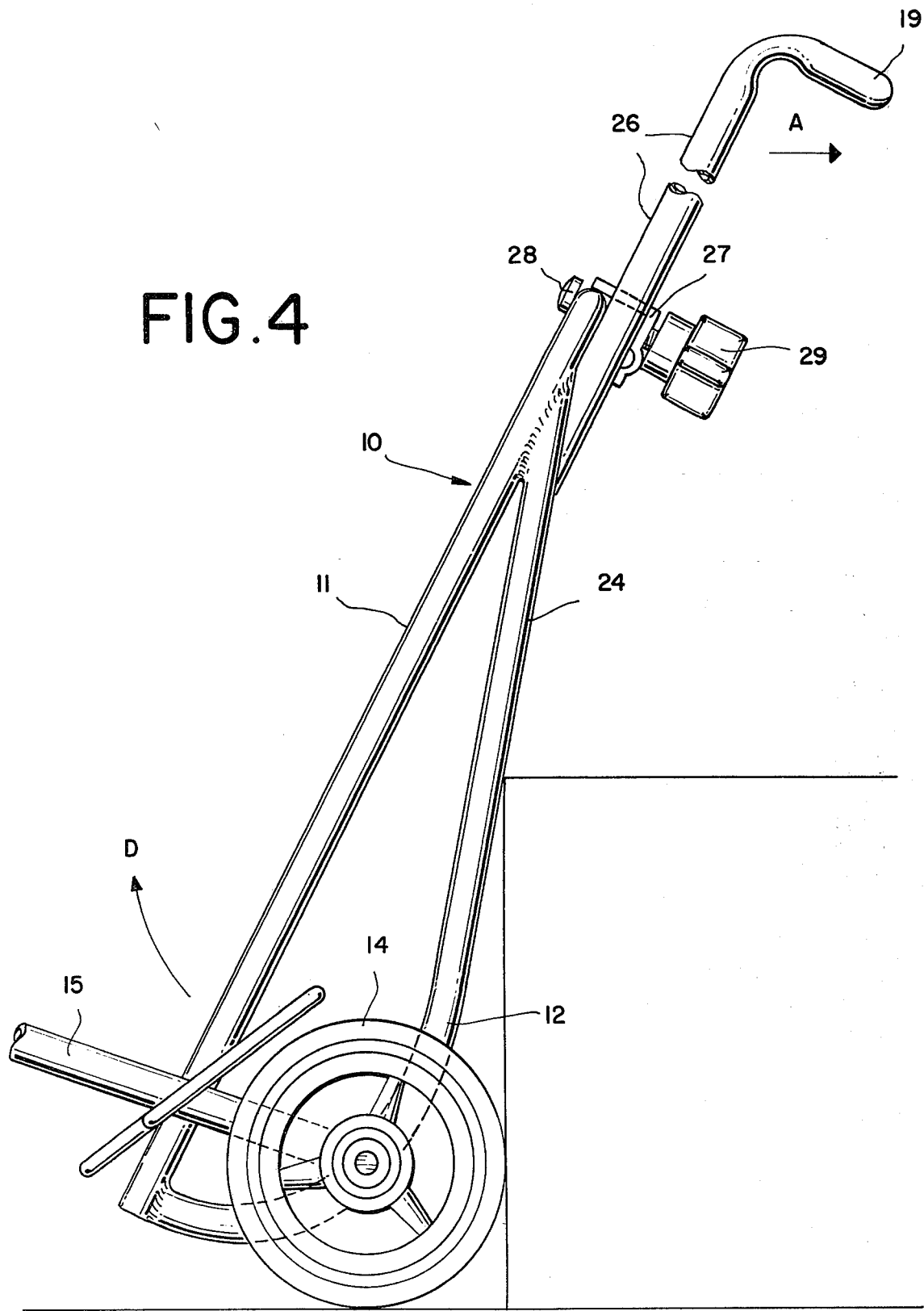
FIG. 4 is a partial view of the hand truck of the present invention at an obstruction.

As can be seen in FIG. 4, the handle 18, when tugged in direction A, has the guide 24 first engaged when it encounters an obstruction. The hand truck 10 pivots on the obstruction and slides along the guide 24 of the axle support 12, either with or without wheels 14 engaging the obstruction. At some point, both the guide 24 and wheels 14 engage the obstruction and this continues until only the wheels 14 engage the obstruction after which the hand truck 10, with its load, is able to roll freely on in direction A, until it encounters another obstruction.

Figure 3:
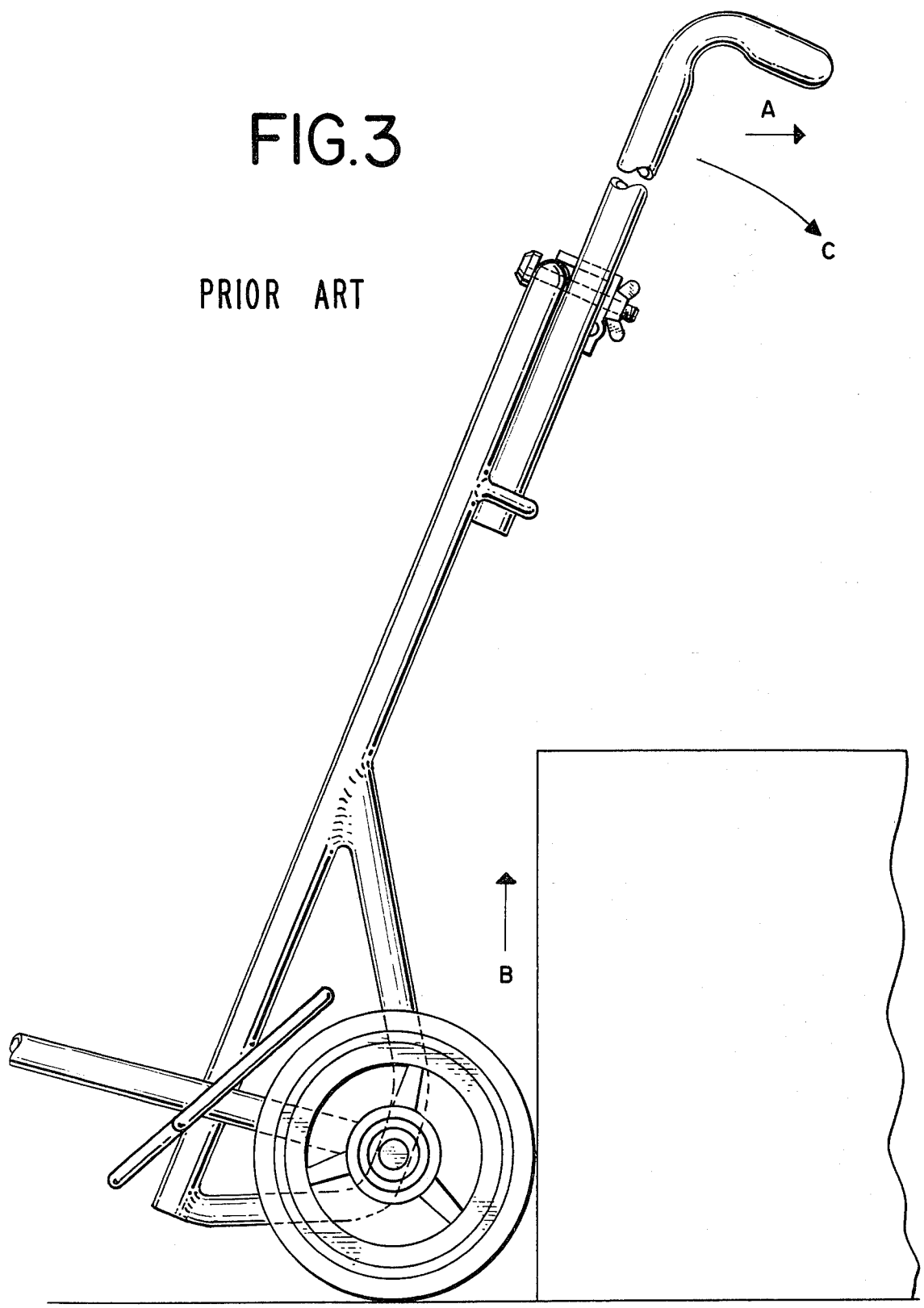
FIG. 3 is a partial view of a hand truck of the prior art at an obstruction.

As can be seen in FIG. 3, a prior art hand truck, moving in direction A, when encountering an obstacle, must have the wheels 14 move upward in direction B or the handle 18 may be swung downward in direction C in order to negotiate the obstruction. There is no smooth pivoting and transition from the guide 24 to the wheels 14 as in the hand truck 10 of the present invention, which continues in direction A, with the load and hand truck 10 in direction D along the inclined plane formed by the guide 24. In the prior art, at the least, each negotiation and obstruction is more difficult with the hand truck 10 pivoting, if pivoting at all, from the handle, to swing upward.

In the present invention, the brace 23 being placed inward of the guides 24, is never threatened with having to face any direct load which might break it loose. The entire back surface of the frame and braces is protected by the guides 24, whereas in the prior art, in the tugging of a hand truck over an obstacle, unexpected portions of the hand truck may be subjected to stresses to which they have not been designed to receive.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A collapsible hand truck comprising:
 (a) a U-shaped tubular frame having first and second arms, the closed end of the U-shape being uppermost in an operative position of said hand truck;
 (b) a first axle support affixed at top and bottom of a rear surface of said first arm;
 (c) a second axle support affixed at top and bottom of a rear surface of said second arm;
 (d) said first and second axle supports being substantially coextensive with said first and second arms respectively;
 (e) an axle threaded through aligned holes in said first and second axle supports;
 (f) first and second wheels rotatably mounted on opposed ends of said axle outboard of said first and second axle supports respectively;
 (g) a U-shaped tubular platform having first and second aligned holes in third and fourth arms thereof, said first aligned hole being threaded on said axle between said first wheel and said first arm and said second aligned hole being threaded on said axle between said second wheel and said second arm, said U-shaped platform being hingeable on said axle between an inoperative position and an operative position;
 (h) a U-shaped tubular retractable handle having fifth and sixth arms disposed generally parallel to and behind said frame;
 (i) first and second spaced-apart parallel bars extending between corresponding positions on said first and second arms;
 (j) a third bar extending between corresponding positions on said first and second axle supports, said third bar being disposed generally intermediate said first and second bars and spaced rearward of said first and second bars a distance effective to permit a guiding fit on said retractable handle at least in a retracted position thereof with said first and second bars contacting a first side of said fifth and sixth arms and said third bar contacting a second opposed side of said retractable handle;
 (k) means on said closed end of said U-shaped tubular frame for clamping said retractable handle in at least one of said retracted position and an extended position;
 (l) said first and second axle supports each including a guide portion, each guide portion sloping to the top of its respective first and second arm; and
 (m) said third bar lying completely forward of a surface defined by rearmost portions of said guide portions whereby said third bar is protected from contact with an obstruction during use of said hand truck.

2. The invention of claim 1 wherein said first and second axle supports including said guide portions each comprise a single piece of bent tubing, the outer portion of said bent tubing acting as said surface.

3. The invention of claim 1 or 2 wherein said axle supports are welded to said frame.

4. The invention of claim 1 or 2 wherein said third bar includes means adapted to stop said handle in said extended position.

5. The invention of claim 3 wherein said third bar includes means adapted to stop said handle in said extended position.

* * * * *